(12) United States Patent
Chung

(10) Patent No.: US 12,277,729 B2
(45) Date of Patent: Apr. 15, 2025

(54) METHOD FOR PROVIDING VISUAL CONTENT, HOST, AND COMPUTER READABLE STORAGE MEDIUM

(71) Applicant: HTC Corporation, Taoyuan (TW)

(72) Inventor: Wei-Jen Chung, Taoyuan (TW)

(73) Assignee: HTC Corporation, Taoyuan (TW)

( * ) Notice: Subject to any disclaimer, the term of this patent is extended or adjusted under 35 U.S.C. 154(b) by 97 days.

(21) Appl. No.: 17/869,798

(22) Filed: Jul. 21, 2022

(65) Prior Publication Data

US 2023/0351632 A1    Nov. 2, 2023

Related U.S. Application Data

(60) Provisional application No. 63/335,229, filed on Apr. 27, 2022.

(51) Int. Cl.
*G06T 7/73* (2017.01)
*G06T 11/00* (2006.01)

(52) U.S. Cl.
CPC ............... *G06T 7/74* (2017.01); *G06T 11/00* (2013.01); *G06T 2207/30244* (2013.01)

(58) Field of Classification Search
CPC ............ G06T 7/55–596; G06T 7/70–75
See application file for complete search history.

(56) References Cited

U.S. PATENT DOCUMENTS

| | | | |
|---|---|---|---|
| 2015/0302649 A1* | 10/2015 | Komatsu | G06T 7/70 345/633 |
| 2021/0243362 A1* | 8/2021 | Castillo | G06V 10/26 |
| 2022/0180562 A1* | 6/2022 | Eastman | G02B 27/01 |
| 2022/0254125 A1* | 8/2022 | Koch | G06F 3/014 |
| 2023/0079388 A1* | 3/2023 | Fisher | G06T 7/246 382/103 |

FOREIGN PATENT DOCUMENTS

| | | |
|---|---|---|
| TW | 201743165 | 12/2017 |
| TW | 202022319 | 6/2020 |

OTHER PUBLICATIONS

Azimi, Ehsan, et al. "Alignment of the virtual scene to the tracking space of a mixed reality head-mounted display." arXiv preprint arXiv:1703.05834 (2017). (Year: 2017).*

(Continued)

*Primary Examiner* — Ryan McCulley
(74) *Attorney, Agent, or Firm* — JCIPRNET

(57) ABSTRACT

The embodiments of the disclosure provide a method for providing a visual content, a host, and a computer readable storage medium. The method includes: providing a reference object at a first location to aim at a first point and accordingly determining a first reference line related to the first point, wherein the first point is associated with an external camera; providing the reference object at a second location to aim at the first point and accordingly determining a second reference line related to the first point; determining a camera position of the external camera based on the first reference line and the second reference line; obtaining a specific image captured by the external camera; and generating a specific visual content via combining the specific image with a virtual scene based on the camera position.

19 Claims, 6 Drawing Sheets

(56) References Cited

OTHER PUBLICATIONS

Dela Antonio, Fabio. "RealityMixer/Instructions.md." Retrieved from https://web.archive.org/web/20210817014118/https://github.com/fabio914/RealityMixer/blob/main/Instructions.md on Dec. 19, 2023 (Year: 2021).*

"Office Action of Taiwan Counterpart Application", issued on Mar. 28, 2023, p. 1-p. 8.

* cited by examiner

METHOD FOR PROVIDING VISUAL CONTENT, HOST, AND COMPUTER READABLE STORAGE MEDIUM

CROSS-REFERENCE TO RELATED APPLICATION

This application claims the priority benefit of U.S. provisional application Ser. No. 63/335,229, filed on Apr. 27, 2022. The entirety of the above-mentioned patent application is hereby incorporated by reference herein and made a part of this specification.

BACKGROUND

1. Field of the Invention

The present disclosure generally relates to a mechanism for providing contents, in particular, to a method for providing a visual content, a host, and a computer readable storage medium.

2. Description of Related Art

The mixed reality capture (MRC) technology can be used to provide a third person viewing angle for virtual reality (VR) users. In the MRC, an external camera needs to be disposed for obtaining the images corresponding to the third person viewing angle.

In the image rendering process of VR applications, an application image rendered based on an application camera (which has the same viewing angle as the external camera) can be combined with the camera image captured by the external camera into a mixed image for (live) broadcast.

However, if the position of the external camera is incorrect, the viewing angles of the application camera and the external camera may be different. In this case, the quality of the generated mixed image will be degraded.

For example, if a user being captured by the external camera is holding virtual objects rendered based on the viewing angle of the application camera, the user should look like holding the virtual objects in the mixed image. If the position of the external camera is incorrect, the virtual objects in the mixed image may be deviated from the user's hands, which may lead to unsatisfying visual experiences.

Therefore, it is crucial to obtain a correct position of the external camera.

SUMMARY OF THE INVENTION

Accordingly, the disclosure is directed to a method for providing a visual content, a host, and a computer readable storage medium, which may be used to solve the above technical problems.

The embodiments of the disclosure provide a method for providing a visual content, adapted to a host. The method includes: providing a reference object at a first location to aim at a first point and accordingly determining a first reference line related to the first point, wherein the first point is associated with an external camera; providing the reference object at a second location to aim at the first point and accordingly determining a second reference line related to the first point; determining a camera position of the external camera based on the first reference line and the second reference line; obtaining a specific image captured by the external camera; and generating a specific visual content via combining the specific image with a virtual scene based on the camera position.

The embodiments of the disclosure provide a host, including a storage circuit and a processor. The storage circuit stores a program code. The processor is coupled to the storage circuit, accessing the program code to perform: providing a reference object at a first location to aim at a first point and accordingly determining a first reference line related to the first point, wherein the first point is associated with an external camera; providing the reference object at a second location to aim at the first point and accordingly determining a second reference line related to the first point; determining a camera position of the external camera based on the first reference line and the second reference line; obtaining a specific image captured by the external camera; and generating a specific visual content via combining the specific image with a virtual scene based on the camera position.

The embodiments of the disclosure provide a computer readable storage medium, the computer readable storage medium recording an executable computer program, the executable computer program being loaded by a host to perform steps of: providing a reference object at a first location to aim at a first point and accordingly determining a first reference line related to the first point, wherein the first point is associated with an external camera; providing the reference object at a second location to aim at the first point and accordingly determining a second reference line related to the first point; determining a camera position of the external camera based on the first reference line and the second reference line; obtaining a specific image captured by the external camera; and generating a specific visual content via combining the specific image with a virtual scene based on the camera position.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
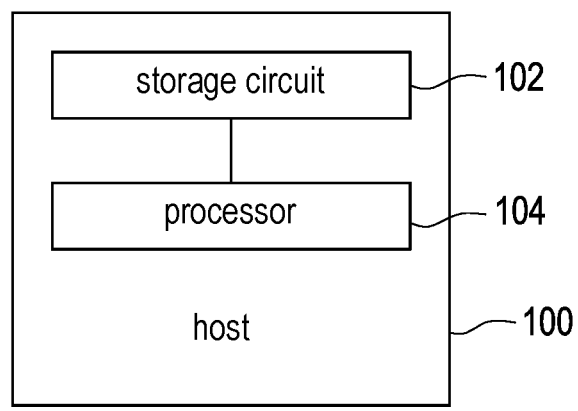
FIG. 1 shows a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host according to an embodiment of the disclosure. In various embodiments, the host 100 can be any electronic device such as a smart device and/or a computer device. In some embodiments, the host 100 can be a head-mounted display (HMD) of a reality system (e.g., a VR system, an augmented reality (AR) system, a mixed reality (MR) system, or the like). In some embodiments, the host 100 can be a (stand-alone) HMD providing a visual content (e.g., a VR content) for the user/wearer to see, but the disclosure is not limited thereto.

In FIG. 1, the host 100 includes a storage circuit 102 and a processor 104. The storage circuit 102 is one or a combination of a stationary or mobile random access memory (RAM), read-only memory (ROM), flash memory, hard disk, or any other similar device, and which records a program code and/or a plurality of modules that can be executed by the processor 104.

The processor 104 is coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In some embodiments, the host 100 can be configured to perform tracking functions, such as inside-out tracking and/or outside-in tracking, to track the pose of the host 100. In some embodiments, the host 100 can be disposed with one or more cameras (e.g., the front camera) for capturing the images of the environment where the host 100 locates. In one embodiment, the host 100 can track the pose of the host 100 based on the captured images by performing, for example, simultaneous localization and mapping (SLAM). In some embodiments, the pose of the host 100 can be characterized by one or more component of the host 100 on one or more degree of freedom (DOF), such as the so-called 6DOF of the host 100, but the disclosure is not limited thereto.

Figure 2:
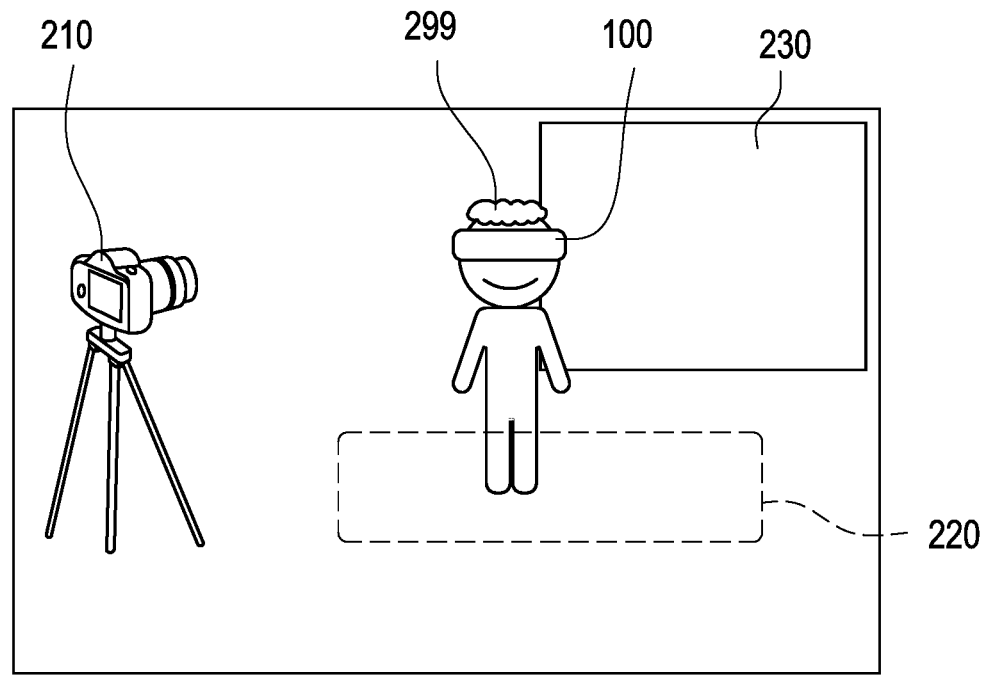
FIG. 2 shows a schematic diagram of an MRC application scenario according to an embodiment of the disclosure.

In the embodiments of the disclosure, the host 100 can be used for the MRC application scenario. See FIG. 2, which shows a schematic diagram of an MRC application scenario according to an embodiment of the disclosure. In FIG. 2, the host 100 can be an HMD worn by the user 299. In addition, an external camera 210 can be disposed outside of a tracking area 220 for capturing images of the user 299 and/or the host 100 in a third person viewing angle. In the embodiment, the tracking area 229 is an area where the host 100 and/or the user 299 is allowed to move. Since the external camera 210 is not in or near the tracking area 200, it is difficult for the user 299 to determine the camera position of the external camera 210 by conventional ways, such as physically touching the external camera 210 with handheld controllers connected with the host 100. Accordingly, the embodiments of the disclosure provide a mechanism that can be used to determine the camera position of the external camera 210, even if the external camera 210 is distant from the user 299 and/or the host 100.

In the embodiment, a green screen 230 can be disposed in the background of the user 299. In this case, once the external camera 210 captures image of the user 299 and/or the host 100, the host 100 can perform some image pre-processing (e.g., image matting) to the images from the external camera 210. In one embodiment, the host 100 can combine the pre-processed images with virtual scenes (e.g., VR scenes) into a visual content for, e.g., live broadcast, but the disclosure is not limited thereto.

In the embodiments of the disclosure, the processor 104 accesses the modules and/or the program code stored in the storage circuit 102 to implement the method for providing a visual content provided in the disclosure, which would be further discussed in the following.

Figure 3:
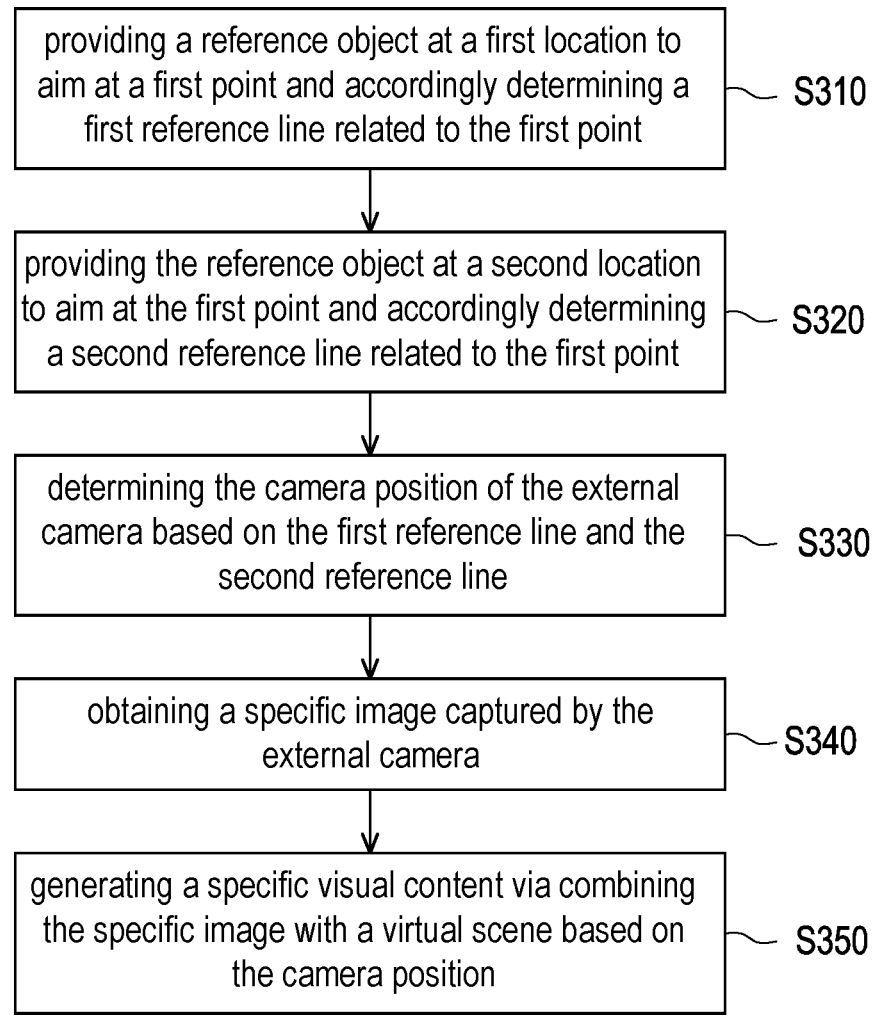
FIG. 3 shows a flow chart of the method for providing a visual content according to an embodiment of the disclosure.

See FIG. 3, which shows a flow chart of the method for providing a visual content according to an embodiment of the disclosure. The method of this embodiment may be executed by the host 100 in FIG. 1, and the details of each step in FIG. 3 will be described below with the components shown in FIG. 1. In addition, for better explaining the concept of the disclosure, FIGS. 2 and 4A-4E would be used as an example, wherein and FIG. 4A-4E show schematic diagrams of determining a camera location according to an embodiment of the disclosure.

In the embodiments of the disclosure, before method of FIG. 3 starts, the processor 103 may provide an instruction to instruct the user 299 to place the external camera 210 horizontally while facing a center of the tracking area 220, and the user 299 may be instructed to stand at a first location L1 within the tracking area 220, but the disclosure is not limited thereto. In other embodiments, the external camera 210 can be placed in different ways according to the requirements of the designer.

In one embodiment, the first location L1 can be the center of the tracking area 220. In other embodiments, the first location L1 can be other location within the tracking area 220 according to the requirements of the designer.

In the embodiments of the disclosure, during obtaining the camera position of the external camera 210, the host 100 can operate in a pass-through mode. That is, the host 100 can capture images of the environment in front of the user 299 with, for example, front cameras and show the captured images to the user 299 as the visual contents. In this case, the user 299 can see the environment while wearing the host 100, which means that the user 299 can see the external camera 210 in the visual contents provided by the host 100.

In some embodiments, during obtaining the camera position of the external camera 210, the host 100 can operate in a see-through mode. That is, the user can directly see the environment while wearing the host 100 via, for example, transparent display panel of the host 100, but the disclosure is not limited thereto.

Figure 4C:
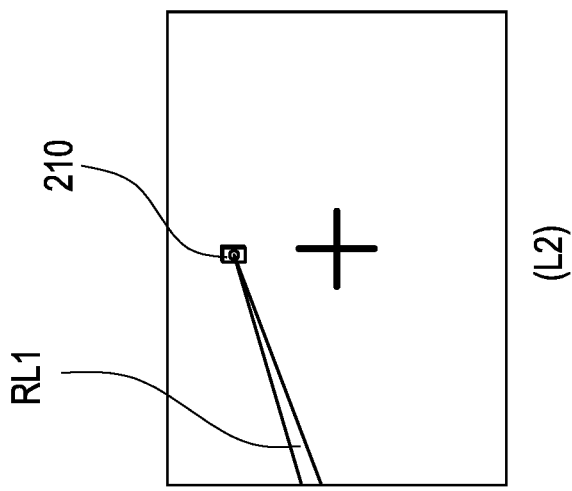
FIG. 4A-4E show schematic diagrams of determining a camera location according to an embodiment of the disclosure.
Figure 4B:
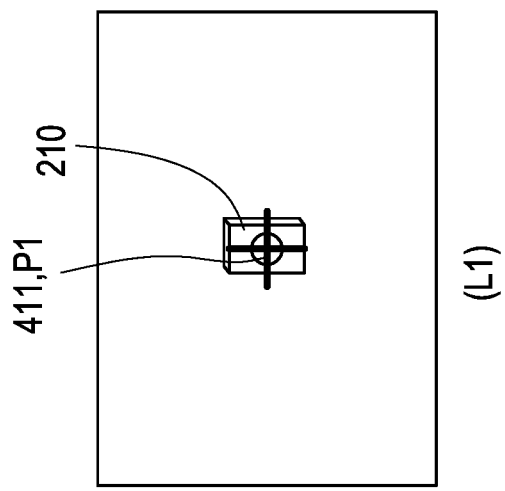
Figure 4A:
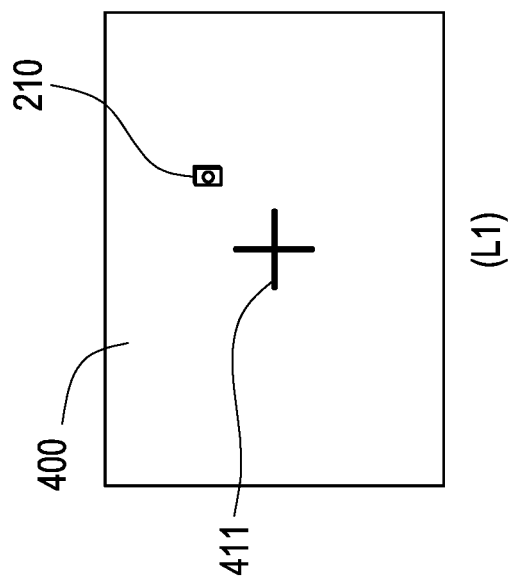

In FIG. 4A, it is assumed that the processor 104 shows the visual content 400 to the user 299 in a specific field of view when operating in the pass-through mode or the see-through mode, and the user 299 can see the external camera 210 in the visual content 400. In the embodiment, the specific field of view corresponds to a specific eye image (e.g., the left eye image or the right eye image) provided by the host 100. That is, only one eye of the user 299 can see the visual content 400. In this case, the processor 104 may perform some steps for facilitating the user 299 to determine the camera position of the external camera 210. Detailed discussion would be provided in the following.

In step S310, the processor 104 provides a reference object 411 at the first location L1 to aim at a first point P1 and accordingly determining a first reference line RL1 related to the first point P1, wherein the first point P1 is associated with the external camera 210.

In FIG. 4A, in response to determining that the host 100 is at the first location L1 (e.g., the center of the tracking area 220), the processor 104 shows the reference object 411 at a specific position in the specific field of view. In different embodiments, the specific position for showing the reference object 411 can be the center of the specific field of view or other desired position.

In the embodiments of the disclosure, the reference object 411 can be a reference ray forwardly emitted from the eye of the user. In one embodiment, since the reference ray can be parallel to the sight of the user, the reference ray would seem like a point to the user as shown in FIG. 4A. For facilitating the user to see the reference object 411, the processor 104 can create a visual aid (e.g., the cross-shaped aim with a center corresponding to the reference object 411) for the user to see, but the disclosure is not limited thereto.

In one embodiment, the reference object 411 can be a reference ray emitted from the handheld controller connected to the host 100. In this case, the user can see the reference ray in the visual content 400, but the disclosure is not limited thereto.

In one embodiment, for determining the camera position of the external camera 210, the considered first point P1 can be assumed to be corresponding to the center of the lens of the external camera 210.

In one embodiment, the processor 104 may instruct the user 299 to aim the first point P1 with the reference object 411 when the host 100 is at the first location L1. In the embodiment where the reference object 411 corresponds to the reference ray emitted from the handheld controller, the reference object 411 can be moved in response to the movement of the handheld controller connected with the host 100. Accordingly, the user 299 may move the handheld controllers around for trying to align the reference object 411 with the first point P1.

In the embodiment where the reference object 411 corresponds to the reference ray emitted from the eye of the user, the position of the reference object 411 can be fixed in the specific field of view, and the visual content 400 can be varied in response to the movement of the user's head. Accordingly, the user 299 may move the his/her head for trying to align the reference object 411 with the first point P1, but the disclosure is not limited thereto.

Once the user 299 determines that the reference object 411 has been aligned with the first point P1 (e.g., the center of the lens of the external camera 210), the user 299 may perform a confirming operation such as pressing specific buttons on the handheld controllers or the host 100 for notifying the host 100.

In FIG. 4B, in response to determining that the confirming operation is detected during providing the reference object 411 at the first location L1, the processor 104 obtains a current representative position of a representative object and a current position corresponding to the reference object 411.

Next, the processor 104 determines the first reference line RL1, wherein the first reference line RL1 passes through the current representative position and the current position.

In one embodiment, the representative object can be the host 100 if the reference object 411 is moved in response to the movement of the host 100. In this case, the processor 104 may create a line passing the current representative position of the host 100 and the current position corresponding to the reference object 411 as the first reference line RL1.

In another embodiment, the representative object can be the handheld controller if the reference object 411 is moved in response to the movement of the handheld controller. In this case, the processor 104 may create a line passing the current representative position of the handheld controller and the current position corresponding to the reference object 411 as the first reference line RL1.

In step S320, the processor 104 provides the reference object 411 at a second location L2 and accordingly determining a second reference line RL2 related to the first point P1.

In one embodiment, after determining the first reference line L1, the processor 104 may instruct the user 299 to move to another location within the tracking area 220. In one embodiment, the user 299 can choose any location other than the first location L1 in the tracking area 220 as the second location L2.

In response to determining that the host 100 is at the second location L2, the processor 104 shows the reference object 411 at the specific position in the specific field of view, as shown in FIG. 4C.

In one embodiment, since any location within the tracking area 220 is possible to be considered as the second location L2, the processor 104 can show reference object 411 during the user 299 moving the host 100, but the disclosure is not limited thereto.

In one embodiment, the processor 104 may instruct the user 299 to aim the first point P1 with the reference object 411 when the host 100 is at the second location L2. Accordingly, the user 299 may move his/her head around and/or move the handheld controllers around for trying to align the reference object 411 with the first point P1.

Once the user 299 determines that the reference object 411 has been aligned with the first point P1 (e.g., the center of the lens of the external camera 210), the user 299 may perform the confirming operation such as pressing specific buttons on the handheld controllers or the host 100 for notifying the host 100.

Figure 4E:
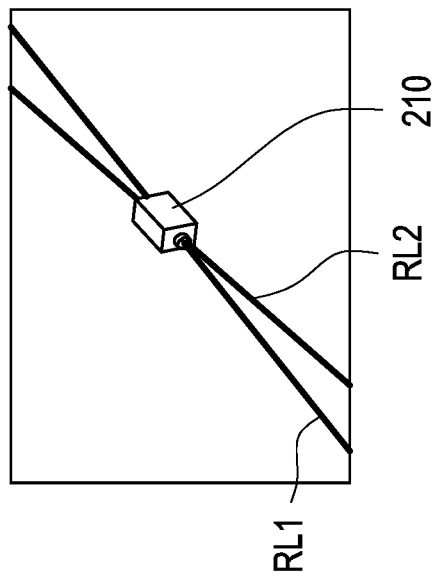
Figure 4D:
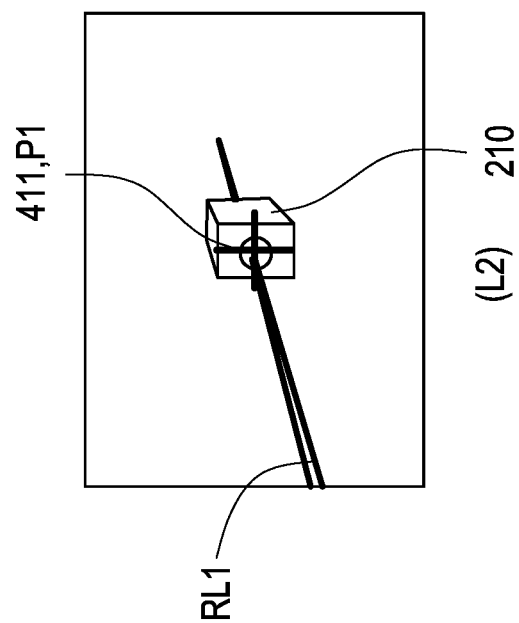

In FIG. 4D, in response to determining that the confirming operation is detected during providing the reference object 411 at the second location L2, the processor 104 obtains a second representative position of the representative object and a current position corresponding to the reference object 411.

Next, the processor 104 determines the second reference line RL2, wherein the second reference line RL2 passes through the second representative position and the current position.

In one embodiment, the representative object can be the host 100 if the reference object 411 is moved in response to the movement of the host 100. In this case, the processor 104 may create a line passing the current representative position of the host 100 and the current position corresponding to the reference object 411 as the second reference line RL2, as shown in FIG. 4E.

In another embodiment, the representative object can be the handheld controller if the reference object 411 is moved in response to the movement of the handheld controller. In this case, the processor 104 may create a line passing the current representative position of the handheld controller and the current position corresponding to the reference object 411 as the second reference line RL2.

In one embodiment, the accuracy of the determination of the camera position would be better if the angle between the first reference line RL1 and the second reference line RL2 is large.

Accordingly, during the host 100 is being moved within the tracking area 220, the processor 104 obtains an instantaneous reference line related to the first point P1 during the movement of the host 100. In one embodiment, the instantaneous reference line can be determined based on the similar principle as determining the first reference line RL1, but no confirming operation from the user 299 is needed. That is, whenever the reference object 411 is moved, a line passing through the current representative position of the representative object and the reference position corresponding to the reference object 411 would be used as the instantaneous reference line, but the disclosure is not limited thereto.

In this case, the processor 104 determines whether the angle between the first reference line RL1 and the instantaneous reference line is less than an angle threshold (e.g., 15 degrees). In response to determining that the angle between the first reference line RL1 and the instantaneous reference line is less than the angle threshold, the processor 104 may instruct the user 299 to move farther from the first location L1 for achieving a better position determination result.

On the other hand, in response to determining that the angle between the first reference line RL1 and the instantaneous reference line is not less than the angle threshold, the processor 104 may instruct the user 299 that a current location is suitable to be regarded as the second location L2, but the disclosure is not limited thereto.

In step S330, the processor 104 determines the camera position of the external camera 210 based on the first reference line RL1 and the second reference line RL2.

In one embodiment, the processor 104 may determine the position of the intersection point of the first reference line RL1 and the second reference line RL2 as the camera position of the external camera 210.

In other embodiments, there may be no intersection point of the first reference line RL1 and the second reference line RL2. In this case, the mechanism introduced in FIG. 5 can be used to determine the camera position.

Figure 5:
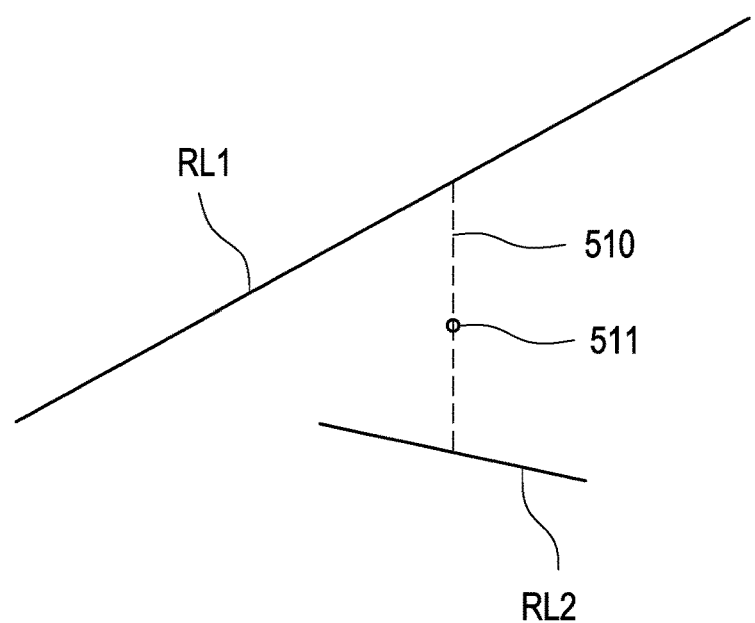
FIG. 5 shows a schematic diagram of determining the camera position based on the first reference line and the second reference line according to an embodiment of the disclosure.

See FIG. 5, which shows a schematic diagram of determining the camera position based on the first reference line and the second reference line according to an embodiment of the disclosure. As shown in FIG. 5, the first reference line RL1 and the second reference line RL2 may be skew lines having no intersection point.

In one embodiment, the processor 104 may obtain a first specific line segment 510 connected between the first reference line RL1 and the second reference line RL2, wherein the first specific line segment 510 corresponds to a shortest distance between the first reference line RL1 and the second reference line RL2. In this case, the processor 104 may determine a position of a first spot 511 (which may be, but not limited to, the middle spot of the first specific line segment 510) on the first specific line segment 510 as the camera position of the external camera 210.

Based on the above, the embodiments of the disclosure can obtain the accurate camera position (e.g., the position of the center of the lens of the external camera 210) of the external camera 210, even if the external camera 210 is distant from the user 299, the host 100, and/or the tracking area 220.

In step S340, the processor 104 obtains a specific image captured by the external camera 210. In one embodiment, the specific image may be an image shot by the external camera 210 to the host 100 and/or the user 299, and the processor 104 may receive the specific image from the external camera 210 via the connection therebetween, but the disclosure is not limited thereto.

In step S350, the processor 104 generates a specific visual content via combining the specific image with a virtual scene based on the camera position. In one embodiment, the processor 104 may firstly perform an image pre-processing (e.g., image matting) to the specific image and superimpose the (pre-processed) specific image onto the virtual scene based on the camera position to generate the specific visual content. The details of combining the specific image with the virtual scene based on the camera position into the specific visual content can be referred to the technical documents related to the MRC technology.

In the embodiments of the disclosure, since the obtained camera position can be obtained in an accurate and convenient way, the specific visual content generated based on the camera position can provide a more satisfying visual experience.

In addition, the embodiments of the disclosure also provide a mechanism for obtaining the orientation of the external camera 210, which can be used to improve the quality of the generated specific visual content. Detailed discussion would be provided in the following.

In one embodiment, the orientation of the external camera 210 can be characterized by the orientation of the lens of the external camera 210. In this case, a normal plane of the lens of the external camera 210 can be used to determine the orientation of the lens of the external camera 210.

In one embodiment, the external camera 210 can be implemented as a smart device (e.g., a smart phone) having a rear camera, and the considered lens can be the lens of the rear camera. In this case, the back panel of the smart device can be used to characterize the normal plane of the lens of the external camera 210. Accordingly, the host 100 can use the concept for determining the camera position of the external camera 210 (which can be understood as the position of the first point P1) to determine the positions of other points (exemplarily referred to as a second point P2 and a third point P3) on the normal plane (e.g., the back panel). After obtaining the positions of the other points on the back panel, the host 100 can accordingly determine the normal plane of the lens of the external camera 210 and accordingly obtain the orientation thereof.

In other embodiments, since the external camera 210 may have no proper plane for characterizing the normal plane, the processor 104 may instruct the user 299 to place a physical object (e.g., a flat panel) near the external camera 210 for characterizing the normal plane of the lens of the external camera 210, but the disclosure is not limited thereto.

Figure 6:
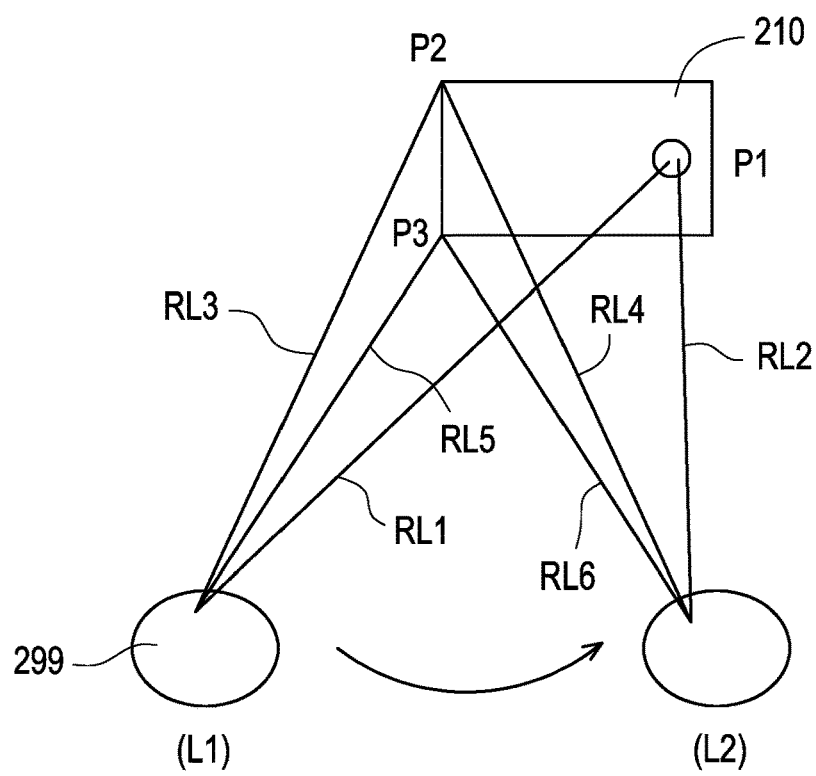
FIG. 6 shows a schematic diagram of determining the orientation of the external camera according to an embodiment of the disclosure.

See FIG. 6, which shows a schematic diagram of determining the orientation of the external camera according to an embodiment of the disclosure.

In FIG. 6, it is assumed that the external camera 210 is a smart device (e.g., a tablet computer) using the rear camera to capture images of the user 299. In this case, the back panel of the smart device can be used to characterize the normal plane of the lens of the rear camera of the smart device.

In one embodiment, when the user 299 and/or the host 100 is at the first location L1, the processor 104 can obtain the first reference line RL1 based on the teachings in the above.

In one embodiment, the processor 104 can determine a third reference line RL3 related to the second point P2 according to the reference object 411 provided at the first location L1, wherein the second point P2 is associated with the external camera 210. In the embodiment, the processor 104 can determine the third reference line RL3 in a similar way of determining the first reference line RL1. For example, when the user 299 and/or the host 100 is at the first location L1, the processor 104 may instruct the user 299 to pick a desired point on the back panel and/or the physical object used for characterizing the normal plane of the rear camera as the second point P2 (e.g., one of the corners of the back panel). Next, the processor 104 may ask the user 299 to aim the second point P2 with the reference object 411 in FIG. 3 and perform the confirming operation. After detecting that the user 299 has performed the confirming operation, the processor 104 may create a line passing the current representative position of the host 100 and a current position corresponding to the reference object 411 as the third reference line RL3.

In one embodiment, the processor 104 can determine a fifth reference line RL5 related to the third point P3 according to the reference object 411 provided at the first location L1, wherein the third point P3 is associated with the external camera 210. In the embodiment, the processor 104 can determine the fifth reference line RL5 in a similar way of determining the first reference line RL1. For example, when the user 299 and/or the host 100 is at the first location L1, the processor 104 may instruct the user 299 to pick another desired point on the back panel and/or the physical object used for characterizing the normal plane of the rear camera as the third point P3 (e.g., another corner of the back panel). Next, the processor 104 may ask the user 299 to aim the third point P3 with the reference object 411 in FIG. 3 and perform the confirming operation. After detecting that the user 299 has performed the confirming operation, the processor 104 may create a line passing the current representative position of the host 100 and a current position corresponding to the reference object 411 as the fifth reference line RL5.

In one embodiment, the processor 104 may ask the user 299 to orderly aim the first point P1, the second point P2, and the third point P3 with the reference object 411 when the user 299 and/or the host 100 is at the first location L1. To be specific, when the user 299 and/or the host 100 is at the first location L1, the processor 104 may sequentially ask the user 299 to: (1) aim the first point P1 with the reference object 411 and perform the confirming operation; (2) aim the second point P2 with the reference object 411 and perform the confirming operation; and (3) aim the third point P3 with the reference object 411 and perform the confirming operation. In this case, the processor 104 can orderly obtain the first reference line RL1, the third reference line RL3, and the fifth reference line RL5.

In one embodiment, when the processor 104 instructs the user 299 to orderly aim the first point P1, the second point P2, and the third point P3 with the reference object 411, the processor 104 may further provide a corresponding sequence number for each of the first point P1, the second point P2, and the third point P3. For example, the first point P1 can be labelled as point number 1, the second point P2 can be labelled as point number 2, and the third point P3 can be labelled as point number 3, but the disclosure is not limited thereto.

In one embodiment, the processor 104 may instruct the user 299 to move to the second location L2. When the user 299 and/or the host 100 is at the second location L2, the processor 104 can obtain the second reference line RL2 based on the teachings in the above.

In one embodiment, the processor 104 can determine a fourth reference line RL4 related to the second point P2 according to the reference object 411 provided at the second location L2. In the embodiment, the processor 104 can determine the fourth reference line RL4 in a similar way of determining the first reference line RL1. For example, when the user 299 and/or the host 100 is at the second location L2, the processor 104 may instruct the user 299 to aim the second point P2 with the reference object 411 in FIG. 3 and perform the confirming operation. After detecting that the user 299 has performed the confirming operation, the processor 104 may create a line passing the current representative position of the host 100 and a current position corresponding to the reference object 411 as the fourth reference line RL4.

In one embodiment, the processor 104 can determine a sixth reference line RL6 related to the third point P3 according to the reference object 411 provided at the second location L2, wherein the third point P3 is associated with the external camera 210. In the embodiment, the processor 104 can determine the sixth reference line RL6 in a similar way of determining the first reference line RL1. For example, when the user 299 and/or the host 100 is at the second location L2, the processor 104 may instruct the user 299 to aim the third point P3 with the reference object 411 in FIG. 3 and perform the confirming operation. After detecting that the user 299 has performed the confirming operation, the processor 104 may create a line passing the current representative position of the host 100 and a current position corresponding to the reference object 411 as the sixth reference line RL6.

In one embodiment, the processor 104 may ask the user 299 to orderly aim the first point P1, the second point P2, and the third point P3 with the reference object 411 when the user 299 and/or the host 100 is at the second location L2. To be specific, when the user 299 and/or the host 100 is at the second location L2, the processor 104 may sequentially ask the user 299 to: (1) aim the first point P1 with the reference object 411 and perform the confirming operation; (2) aim the second point P2 with the reference object 411 and perform the confirming operation; and (3) aim the third point P3 with the reference object 411 and perform the confirming operation. In this case, the processor 104 can orderly obtain the second reference line RL2, the fourth reference line RL4, and the sixth reference line RL6.

In one embodiment, the processor 104 can determine the position of the first point P1 (i.e., the camera position) based on the first reference line RL1 and the second reference line RL2 as taught in the above. Similarly, the processor 104 can determine the position of the second point P2 (e.g., one of the corners on the back panel) based on the third reference line RL3 and the fourth reference line RL4 and determine the position of the third point P3 (e.g., another corner on the back panel) based on the fifth reference line RL5 and the sixth reference line RL6. The details of determining the positions of the second point P2 and the third point P3 can be referred to the descriptions of FIG. 5.

After obtaining the positions of the first point P1, the second point P2, and the third point P3, the processor 104 can accordingly determine the normal plane of the lens of the external camera 210, and hence the orientation of the external camera 210 can be determined.

In one embodiment, the processor 104 can generate the specific visual content via combining the specific image with the virtual scene based on the camera position and the orientation of the external camera 210, and the details can be referred to the technical documents related to the MRC technology.

Figure 7:
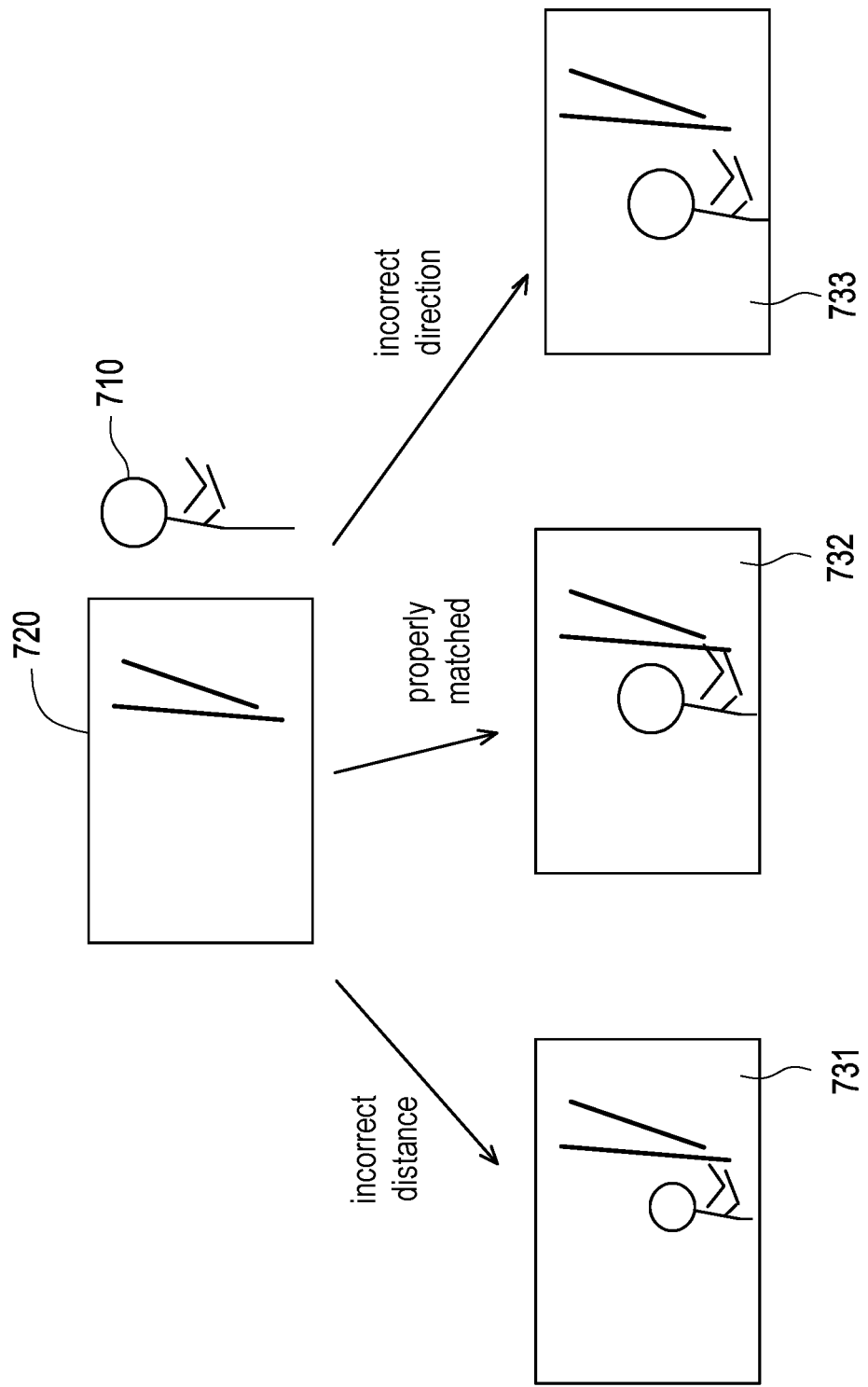
FIG. 7 shows a schematic diagram of an application scenario according to an embodiment of the disclosure.

See FIG. 7, which shows a schematic diagram of an application scenario according to an embodiment of the disclosure. In FIG. 7, it is assumed that the image shot by the external camera 210 to the user 299 has been pre-processed as the specific image 710, and the specific image 710 is to be combined with a virtual scene 720 as the specific visual content.

In the embodiment, the virtual scene 720 can be exemplarily designed with two lightsabers that should seem to be held by the hands of the user 299 in the generated specific visual content.

In one embodiment, if the camera position (e.g., the position of the application camera in the virtual scene) of the external camera 210 is inaccurate, the distance and/or the direction between the user 299 and the lightsabers may be incorrect, such that the lightsabers may seem not held by the hands of the user 299 in the generated specific visual contents 731 and 733.

However, since the embodiments of the disclosure can obtain accurate camera position of the external camera 210, the specific image 710 and the virtual scene 720 can be properly combined, such that the lightsabers may seem to be held by the hands of the user 299 in the generated specific visual content 732.

The disclosure further provides a computer readable storage medium for executing the method for providing a visual content. The computer readable storage medium is composed of a plurality of program instructions (for example, a setting program instruction and a deployment program instruction) embodied therein. These program instructions can be loaded into the host 100 and executed by the same to execute the method for providing a visual content and the functions of the host 100 described above.

In summary, the embodiments of the disclosure provide a novel, accurate and convenient way to determine the camera position and the orientation of the external camera. Accordingly, the quality of the specific visual content generated via combining the captured image with the virtual scene based on the camera position and/or the orientation of the external camera can be improved.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for providing a visual content, adapted to a host, comprising:
   providing a reference object at a first location, wherein the reference object provided at the first location is used to remotely aim at a first point with a first distance and accordingly determining a first reference line related to the first point and displaying the first reference line, wherein the first point is associated with an external camera, wherein the reference object is a virtual object acting as a visual aid and is moved in response to a movement of the host so as to aim at the first point by moving the host;
   instructing to move the host from the first location to another location;
   obtaining an instantaneous reference line related to the first point during a movement of the host;
   in response to determining that an angle between the first reference line and the instantaneous reference line is less than an angle threshold, instructing to move farther from the first location;
   in response to determining that the angle between the first reference line and the instantaneous reference line is not less than the angle threshold, instructing that a current location is suitable to be regarded as a second location
   providing the reference object at the second location, wherein the reference object provided at the second location is used to remotely aim at the first point with a second distance and accordingly determining a second reference line related to the first point and displaying the second reference line;
   determining a camera position of the external camera based on the first reference line and the second reference line;
   obtaining a specific image captured by the external camera; and
   generating a specific visual content via combining the specific image with a virtual scene based on the camera position.

2. The method according to claim 1, further comprising:
   determining a third reference line related to a second point according to the reference object provided at the first location, wherein the second point is associated with the external camera;
   determining a fifth reference line related to a third point according to the reference object provided at the first location, wherein the third point is associated with the external camera;
   determining a fourth reference line related to the second point according to the reference object provided at the second location;
   determining a sixth reference line related to the third point according to the reference object provided at the second location;
   determining an orientation of the external camera based on the first point, the second point, and the third point.

3. The method according to claim 2, wherein the first point, the second point, and the third point are located on a normal plane of a lens of the external camera.

4. The method according to claim 3, further comprising:
   instructing to place a physical object near the external camera for characterizing the normal plane of the lens of the external camera.

5. The method according to claim 2, wherein each of the first point, the second point, and the third point is provided with a corresponding sequence number.

6. The method according to claim 2, wherein the step of generating the specific visual content via combining the specific image with the virtual scene based on the camera position comprises:
   generating the specific visual content via combining the specific image with the virtual scene based on the camera position and the orientation of the external camera.

7. The method according to claim 1, comprising:
   in response to determining that the host is at the first location, showing the reference object at a specific position in a specific field of view, wherein the specific field of view corresponds to a specific eye image provided by the host;
   in response to determining that the host is at the second location, showing the reference object at the specific position in the specific field of view.

8. The method according to claim 1, wherein the step of determining the first reference line related to the first point comprises:
   in response to determining that a confirming operation is detected during providing the reference object at the first location, obtaining a current representative position of a representative object and a current position corresponding to the reference object;
   determining the first reference line, wherein the first reference line passes through the current representative position and the current position.

9. The method according to claim 8, further comprising:
   instructing to aim the first point with the reference object.

10. The method according to claim 8, wherein the representative object is the host or a handheld controller connected to the host.

11. The method according to claim 1, wherein the step of determining the camera position of the external camera based on the first reference line and the second reference line comprises:
obtaining a first specific line segment connected between the first reference line and the second reference line, wherein the first specific line segment corresponds to a shortest distance between the first reference line and the second reference line;
determining a position of a first spot on the first specific line segment as the camera position of the external camera.

12. The method according to claim 1, wherein the specific image is an image shot by the external camera to the host, and the step of generating the specific visual content via combining the specific image with the virtual scene based on the camera position comprises:
performing an image pre-processing to the specific image;
superimposing the specific image onto the virtual scene based on the camera position.

13. The method according to claim 1, wherein the host is a head-mounted display, and the host provides the reference object in a pass-through mode.

14. The method according to claim 1, wherein the first point corresponds to a center of a lens of the external camera.

15. A host, comprising:
a storage circuit, storing a program code; and
a processor, coupled to the storage circuit, accessing the program code to perform;
providing a reference object at a first location, wherein the reference object provided at the first location is used to remotely aim at a first point with a first distance and accordingly determining a first reference line related to the first point and displaying the first reference line, wherein the first point is associated with an external camera, wherein the reference object is a virtual object acting as a visual aid and is moved in response to a movement of the host so as to aim at the first point by moving the host;
instructing to move the host from the first location to another location;
obtaining an instantaneous reference line related to the first point during a movement of the host;
in response to determining that an angle between the first reference line and the instantaneous reference line is less than an angle threshold, instructing to move farther from the first location;
in response to determining that the angle between the first reference line and the instantaneous reference line is not less than the angle threshold, instructing that a current location is suitable to be regarded as a second location
providing the reference object at the second location, wherein the reference object provided at the second location is used to remotely aim at the first point with a second distance and accordingly determining a second reference line related to the first point and displaying the second reference line;
determining a camera position of the external camera based on the first reference line and the second reference line;
obtaining a specific image captured by the external camera; and
generating a specific visual content via combining the specific image with a virtual scene based on the camera position.

16. The host according to claim 15, wherein the processor further performs:
determining a third reference line related to a second point according to the reference object provided at the first location, wherein the second point is associated with the external camera;
determining a fifth reference line related to a third point according to the reference object provided at the first location, wherein the third point is associated with the external camera;
determining a fourth reference line related to the second point according to the reference object provided at the second location;
determining a sixth reference line related to the third point according to the reference object provided at the second location;
determining an orientation of the external camera based on the first point, the second point, and the third point.

17. The host according to claim 16, wherein each of the first point, the second point, and the third point is provided with a corresponding sequence number.

18. The host according to claim 16, wherein the processor performs:
generating the specific visual content via combining the specific image with the virtual scene based on the camera position and the orientation of the external camera.

19. A non-transitory computer readable storage medium, the computer readable storage medium recording an executable computer program, the executable computer program being loaded by a host to perform steps of:
providing a reference object at a first location, wherein the reference object provided at the first location is used to remotely aim at a first point with a first distance and accordingly determining a first reference line related to the first point and displaying the first reference line, wherein the first point is associated with an external camera, wherein the reference object is a virtual object acting as a visual aid and is moved in response to a movement of the host so as to aim at the first point by moving the host;
instructing to move the host from the first location to another location;
obtaining an instantaneous reference line related to the first point during a movement of the host;
in response to determining that an angle between the first reference line and the instantaneous reference line is less than an angle threshold, instructing to move farther from the first location;
in response to determining that the angle between the first reference line and the instantaneous reference line is not less than the angle threshold, instructing that a current location is suitable to be regarded as a second location
providing the reference object at the second location, wherein the reference object provided at the second location is used to remotely aim at the first point with a second distance and accordingly determining a second reference line related to the first point and displaying the second reference line;
determining a camera position of the external camera based on the first reference line and the second reference line;

obtaining a specific image captured by the external camera; and generating a specific visual content via combining the specific image with a virtual scene based on the camera position.

* * * * *